United States Patent [19]

Peniston et al.

[11] 4,159,932

[45] Jul. 3, 1979

[54] PROCESS FOR ACTIVATING CHITIN BY MICROWAVE TREATMENT AND IMPROVED ACTIVATED CHITIN PRODUCT

[76] Inventors: Quintin P. Peniston, Rte. 7, Box 7710, Bainbridge Island, Wash. 98110; Edwin L. Johnson, Rte. 5, Box 4246, Issaquah, Wash. 98027

[21] Appl. No.: 866,792

[22] Filed: Jan. 3, 1978

[51] Int. Cl.² ................................................. B01J 1/10
[52] U.S. Cl. ............................................... 204/158 R
[58] Field of Search ........................ 204/158 R, 160.1; 432/245

[56] References Cited

U.S. PATENT DOCUMENTS 4,000,032  12/1976  Bergstrom et al. .............. 204/158 R
4,018,678  4/1977  Peniston et al. ..................... 423/245

Primary Examiner—Howard S. Williams
Attorney, Agent, or Firm—Rines and Rines, Shapiro and Shapiro

[57] ABSTRACT

This disclosure is concerned with a process for treating chitin under certain moisturized conditions with microwave energy to increase its reactivity in general, and when in appropriate alkali, to accelerate the deacetylation thereof. Highly active chitin products or derivatives are thus produced.

7 Claims, No Drawings

PROCESS FOR ACTIVATING CHITIN BY MICROWAVE TREATMENT AND IMPROVED ACTIVATED CHITIN PRODUCT

The present invention relates to the activation of chitin, being more particularly directed to processes for increasing the reactivity of the same and thereby providing novel highly reactive chitin and derivatives thereof.

Chitin, the naturally occurring carbohydrate substance which notably constitutes the structural material in the exoskeletons of animals of the phylum arthropoda, is a long-chain linear polymer having 2-acetylamino glucose as its primary building unit. These units are joined by beta, 1-4 glycosidic linkages as in cellulose with a degree of polymerization of 2000 or more units in the native state. Processes for extracting chitin from such exoskeletons and for utilization of the extract and deacetylized products of the same (chitosan) are described, for example, in our prior U.S. Pat. Nos. 3,533,940; 3,862,122; 3,922,260; and 4,018,678.

Numerous studies on the molecular structure of chitin have been conducted employing x-ray diffraction (D. Carlstrom and J. Brophys., Biochem Cytol., 3, 669 (1957)), infrared spectroscopy, (F. G. Pearson, R. H. Marchessault and C. Y. Liang, J. Polymer Science, 43, 101 (1960)), proton magnetic resonance (Michael Falk, D. G. Smith, J. McLachlan and A. G. McInnes, Canadian Journal of Chemistry, 44, 2269 (1966)), and other techniques. These have established that chitin chains occur in bundles or micelles with essentially parallel orientation but different types and degrees of crystallinity depending on the source organism and manner of isolation. Three different unit cell configurations have been observed which have been designated as alpha, beta and gamma chitin. These appear to arise from alignment of adjacent chains respectively in antiparallel, parallel and a mixed configuration, with two chains parallel and one antiparallel. Interconversion of crystal forms can occur depending on isolation methods and treatment. In alpha chitin, as reported in the above-mentioned Carlstrom et al article, the unit cell has unit cell dimensions of 4.76 by 18.85 Angstrom units normal to the fiber axis, and an axial length of 10.28 Angstrom units. The Pearson et al paper discloses that intermolecular hydrogen bonding between carbonyl and amino groups occurs extensively in crystalline regions.

The dense packing of chains and the extensive hydrogen bonding in crystalline regions of chitin results in a very low chemical reactivity, resistance to swelling, and lack of solubility except in strong mineral acids which cause partial hydrolysis of glycosidic linkages. Partial solubility is observed, however, in some solvent mixtures such as lithium chloride and N, N-dimethyl acetamide.

In our own studies on deacetylation of chitin, as disclosed in some of our first-named patents, we have found that high concentrations of sodium hydroxide are necessary to cause sufficient swelling to permit reasonable rates of deacetylation. The time required for deacetylation to 4.5% acetyl content (a soluble chitosan product), in 50 weight percent sodium hydroxide at 120° C., for example, is about four hours. While with 40 percent sodium hydroxide, the time is about eight hours; and with 35 percent sodium hydroxide, twenty hours or more.

We have also found that rate curves for deacetylation appear to represent two independent simultaneous reactions which can be approximately fitted by an equation of the type:

$$\% \text{ Deacetylation} = Ae^{-k_1 t} + Be^{-k_2 t},$$

where A represents the percent of the chitin existing as "amorphous" micellar regions, and B, the percent of crystalline regions. The rate constant $K_1$ is generally found to be 15 to 20 times $K_2$. It thus appears that resistance to deacetylation is primarily due to inactivity in the crystalline regions of the micelles. This may be caused by inaccessibility of reactive sites to the deacetylation catalyst or by stabilization through hydrogen bonding.

Resistance of chitin to chemical reaction is also encountered in derivatizations other than deacetylation, such as xanthation, etherification and esterification. Presumbably these effects are also due to causes similar to those above-postulated for the deacetylation reaction.

Underlying the present invention is the discovery, rather unexpected from vastly dissimilar prior results from other heat-providing sources, that microwave treatment of appropriately conditioned chitin can strikingly increase its activation and reactivity.

An object of the invention, accordingly, is to provide a new and improved process for activating chitin, significantly to increase its reactivity and to provide vastly improved reactive chitin and derivative products therefrom.

A further object is to provide such improved results with the aid of microwave radiation.

Other and further objects are explained hereinafter and are more particularly delineated in the appended claims.

In summary, however, from one of its aspects, the invention embraces a process for enhancement of the reactivity of chitin, that comprises, conditioning the chitin with one of a moistening agent or a chemical reagent mixable with the chitin, and radiating the conditioned chitin with microwave energy. Preferred details are later pointed out.

Specifically, we have found that a marked increase in the reactivity of chitin can be induced by microwave treatment under appropriate conditions of moistening, including when impregnated with strong alkali solutions. Exposure to microwave energy for a period of from about one to thirty minutes, for example, can result in very greatly increased reactivity of the chitin. This is particularly manifested in strongly alkaline media. For example, the time for deacetylation of chitin with prior art heat, as described in said patents, to yield a soluble chitosan product (85% deacetylation) is of the order of about 18 hours for 50% sodium hydroxide at 100° C. with the microwave treatment of the invention, this time is reduced to about 18 minutes with a mean temperature under 80° C. For lower alkali concentrations, the effect is not as marked. Microwave activation is still apparent, moreover, when the chitin is moistened with water alone; but "dry" chitin, i.e. chitin at an equilibrium moisture content of 5-8% water, has not been found to be significantly affected by microwave treatment under the conditions employed for the present invention.

While in theory there appears to be no restriction upon the frequency of the microwave energy employed, we have chosen and preferred a microwave frequency of about 2450 mega-Hertz (11.76 cm. in wavelength). While this is a frequency at which water is absorptive, it is far removed from frequencies causing resonance for water molecules. It thus appears that effects other than agitation of water molecules are responsible for the pronounced activation of chitin reactivity. Though the invention is not dependent upon the correctness of a particular theory or reason for operation, it being sufficient to describe the necessary steps to achieve the results of the invention, we believe that the disruption of hydrogen bonding between adjacent chitin chains in crystalline micellar regions may be a likely explanation for the phenomenon produced by the process.

Another manifestation of the activating effect of the microwave treatment according to the invention which we have observed, is an apparent peptization of partially deacetylated chitin by exposure to microwaves. Deacetylated or partially deacetylated chitin is normally completely insoluble in sodium hydroxide solutions. During removal of the alkali solution used for deacetylation, as by washing with water in the beforementioned prior techniques, some swelling and translucence of the deacetylated chitin may be observed; but gelatinization and coalescence of particles is not usually encountered.

When microwave treatment is used for deacetylation and the particles are held in alkali solution of intermediate concentration (1–15%) for several hours, as later described, the particles have been found to coalesce into a gelatenous mass. This is apparent at even low levels of deacetylation (15 to 20 percent acetyl removal), and increases with extent of deacetylation. Partial solubilization of the deacetylated chitin may also occur. If the removal of alkali solution is conducted rapidly, peptization does not occur and particles remain discrete. Novel highly reactive products are thus produced by the process of the invention.

It is also indicated that the extent of deacetylation necessary to obtain a product soluble in dilute acetic acid is not as high when microwave treatment is employed, as with prior conventional treatment, wherein it is normally found that about 82% deacetylation is necessary to obtain a soluble chitosan product. With microwave treatment in accordance with the invention, almost complete solubility is obtained with about 68% deacetylation. These levels of deacetylation correspond to 4.6 and 7.9% in the product, respectively.

Turning, now, to specific applications of the invention, several examples of process conditions and resulting products will now be explained.

EXAMPLE 1

Chitin from King crab shells (Paralithodes camschatica), isolated by extraction of protein with dilute (2%) sodium hydroxide at 60°–70° C., followed by demineralization with dilute hydrochloric acid, washing with water and drying, was ground to an average particle diameter of about 0.5 millimeters. Fifteen grams of the ground chitin was intimately mixed with 150 grams of 50% sodium hydroxide solution. The mixture was packed in a 250 ml Erlenmeyer flask which was placed in a microwave oven. After 10 minutes of 2450 megaHertz radiation of about 390 watts, the mixture started to boil (150° C.). The flask was cooled. After standing overnight at room temperature, the product was washed with water to neutrality. Washings were pale yellow in color and the product was colorless and completely soluble in 2% acetic acid. It showed a Brookfield viscosity of 11000 centipoises in 2% acetic acid at 20° C.

A sample of the same ground chitin as used above was mixed in the same ratio with 50% sodium hydroxide solution and heated in an air oven at 100° C. It showed complete solubility in 2% acetic acid only after 18 hours. The pale yellow solution showed a viscosity of 700 centipoises at 2% concentration and 20° C.

The microwave treatment thus greatly accelerated the deacetylation reaction over conventional heat-treatment and caused much less degradation.

EXAMPLE 2

Mixtures of the ground chitin used in Example 1 with 30, 40 and 50% sodium hydroxide solutions were prepared, using a total liquor-to-chitin solids ratio of 6 to 1. Aliquots were packaged in small glass vials and were heated in the same microwave oven, using the conditions as in Example 1, for various time periods. Temperatures attained, and after washing, solubility characteristics of the deacetylated products were determined, as shown in the following Table 1:

Table I

Characterization of Microwave-Treated Chitins

| Vial No. | NaOH (% by wt.) | Time (min.) | Final Temp. (°C.) | Solubility (2% Acetic Acid) |
|---|---|---|---|---|
| 1 | 30% | 10 | 90 | Insoluble |
| 2 | 30% | 15 | 103 | Insoluble |
| 3 | 30% | 20 | 116 | Slightly soluble |
| 4 | 40% | 9 | 80 | Slightly soluble |
| 5 | 40% | 12 | 104 | Ca 50% soluble |
| 6 | 40% | 15 | 128 | Almost completely soluble |
| 7 | 50% | 8 | 80 | Ca 75% soluble |
| 8 | 50% | 10 | 120 | Completely soluble |
| 9 | 50% | 12 | 140 | Completely soluble |

With conventional heating at 100° C., soluble products are not attainable in 30% sodium hydroxide with times up to 150 hours. In 40% sodium hydroxide, about 40 hours was required; and with 50% sodium hydroxide, about 18 hours, as in Example 1.

EXAMPLE 3

Ten grams of the chitin used in the previous examples was mixed with 100 ml of distilled water and heated for 1.5 minutes in the same microwave oven at 100% "on time" (650 watts output). The treated chitin was collected on a filter, pressed to a weight of 26.2 grams, and mixed with sufficient 50% sodium hydroxide solution to give a liquor concentration of 36% and a liquor-to-chitin solids ratio of 6 to 1. The mixture was packed in a glass vial and held in a water bath at 51° C. Samples were withdrawn at intervals, washed and tested for solubility in dilute acetic acid. Results were as follows:

| Time of heating | Solubility |
|---|---|
| 20 hours | Ca 50% Soluble |
| 44 hours | Ca 75% Soluble |
| 68 hours | Almost completely soluble |

Parallel experiments in 36% sodium hydroxide were conducted on chitin heated dry in the microwave condition for 1.5 minutes using conditions as above, and on chitin which had received no microwave treatment.

There was no indication of solubility after 100 hours heating at 51° C.

Activation of wet chitin by microwave treatment, though not in the presence of aklali, is thus indicated.

EXAMPLE 4

Ten grams of chitin, as used in Example 1, was mixed with 60 grams of 36% sodium hydroxide and packed in a 250 ml beaker. The mixture was treated in the same microwave oven at 650 watts for 2 minutes. The temperature rose from 30° to 75° C. The treated mix was cooled and pressed on a filter to 38.9 grams. The pressed cake was crumbled and placed in a glass-stoppered bottle. 10 ml of carbon disulfide was added and the bottle was held in a water bath at 20° C. with occasional shaking for two hours. A control sample was prepared in the same manner without microwave treatment. It was heated on a hot plate to 75° C. (5 minutes), cooled, pressed and treated with carbon disulfide as above.

After the xanthation treatment, both samples were diluted with water to 200 ml and allowed to stand at room temperture for 16 hours in stoppered flasks. The solid residues were collected on filters, washed with water and oven dried. After correcting for ash, 25.5% of the microwave-treated chitin was found to be dissolved as the xanthate, but only 10.8% of the untreated chitin dissolved. (More complete xanthation can be obtained by using finely ground chitin). The experiment indicates, however, that activation of chitin by microwave treatment is effective in the xanthation reaction.

EXAMPLE 5

Chitin from Alaska King Crab shell which had not been previously dried (35% solids) was treated in a dilute slurry in a Waring blender for 10 minutes. The chitin particles, initially ⅛" to ¼" in average diameter, were reduced to a fluffy fibrilar state. The fibers were collected on a filter and pressed to a solids concentrations of 20%. The mat of fibers was divided into two portions, one of which was treated in the same microwave oven for 5 minutes. Both portions were then air dried at 40° C. for 36 hours. One gram of each portion was placed in stoppered vials to which 10 ml of N, N dimethyl acetamide and 50 mg. of lithium chloride were added.

The vials were heated in a water bath at 55° C. for 16 hours. At the end of this period, most of the microwave-treated sample had dissolved, forming a viscous solution. On pouring a small amount of this solution into acetone, fibrils of reprecipitated chitin were formed.

No solubility was noted in the sample not treated with the microwave radiation.

Further modifications will also occur to those skilled in this art, and such are considered to fall within the spirit and scope of the invention as defined in the appended claims.

What is claimed is:

1. A process for enhancement of the reactivity of chitin, that comprises, conditioning the chitin with one of water or a strong alkali mixable with the chitin, and radiating the conditioned chitin with microwave energy.

2. A process as claimed in claim 1 and in which the chitin, prior to its conditioning is particularized.

3. A process as claimed in claim 2 for increasing the solubility of the chitin and in which the particularized chitin following said microwave radiating is subsequently dried at a temperature below about 50° C. and is then subjected to the dissolving action of a suitable solvent.

4. A process as claimed in claim 1 and in which the strong alkali is an aqueous solution of sodium hydroxide for deacetylation of the chitin containing from 35 to 50% sodium hydroxide by weight.

5. A process as claimed in claim 4 and in which the time of microwave radiation treatment is adjusted from about 5 to about 60 minutes.

6. An activated chitin product or derivative prepared in accordance with the process of claim 1.

7. An activated chitin derivative as claimed in claim 6 comprising chitosan.

* * * * *